United States Patent [19]

Tohge

[11] Patent Number: 4,512,802
[45] Date of Patent: Apr. 23, 1985

[54] PROCESS FOR THE DECARBURIZATION OF MOLTEN METAL

[75] Inventor: Takeya Tohge, Yokohama, Japan

[73] Assignee: Nippon Yakin Kogyo Kabushiki Kaisha, Tokyo, Japan

[21] Appl. No.: 477,001

[22] Filed: Mar. 21, 1983

[51] Int. Cl.³ .................................................. C21C 5/32
[52] U.S. Cl. ............................................ 75/60; 75/59
[58] Field of Search ...................................... 75/60, 59

[56] References Cited

U.S. PATENT DOCUMENTS 3,816,720  6/1974  Bauer ...................................... 75/60

Primary Examiner—Peter D. Rosenberg
Attorney, Agent, or Firm—Balogh, Osann, Kramer, Dvorak, Genova & Traub

[57] ABSTRACT

A computer implemented process for optimizing the decarburization of a predetermined mass of molten metal by controlling the amount of coolants, the charging time of coolants, the dilution ratio of injected oxygen to inert gas, the changing time of the dilution ratio and the amount of injected gases which includes: considering from a standpoint of kinetic theory the reaction in AOD vessel is composed of following three reactions, i.e., the reaction in the vicinity of tuyeres, the reaction taking place in the ascending process of bubbles and the reaction in the interface between metal and slag; establishing the mathematical Model I; establishing the mathematical Model II calculated capably in short time and kinetically from the result using the mathematical Model I, and from the vessel factor calculated from the data of an actual operation; and further utilizing the mathematical Model II as a controlling program in an actual operation.

3 Claims, 7 Drawing Figures

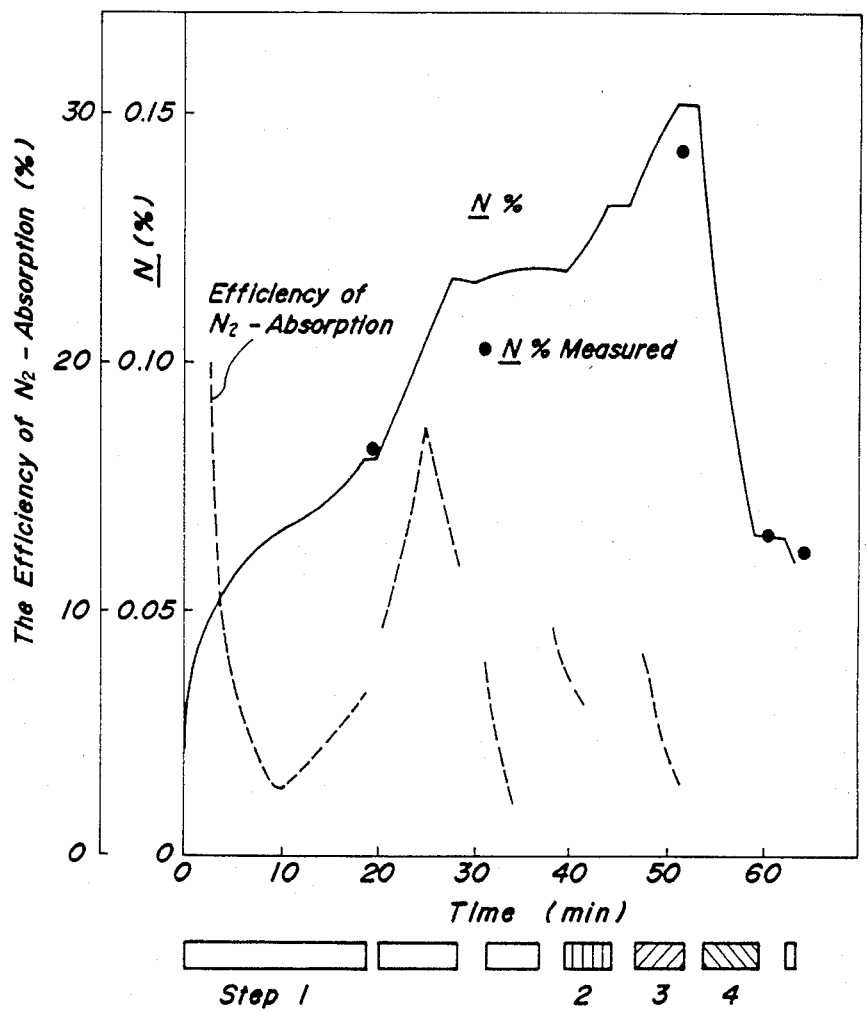
FIG_5

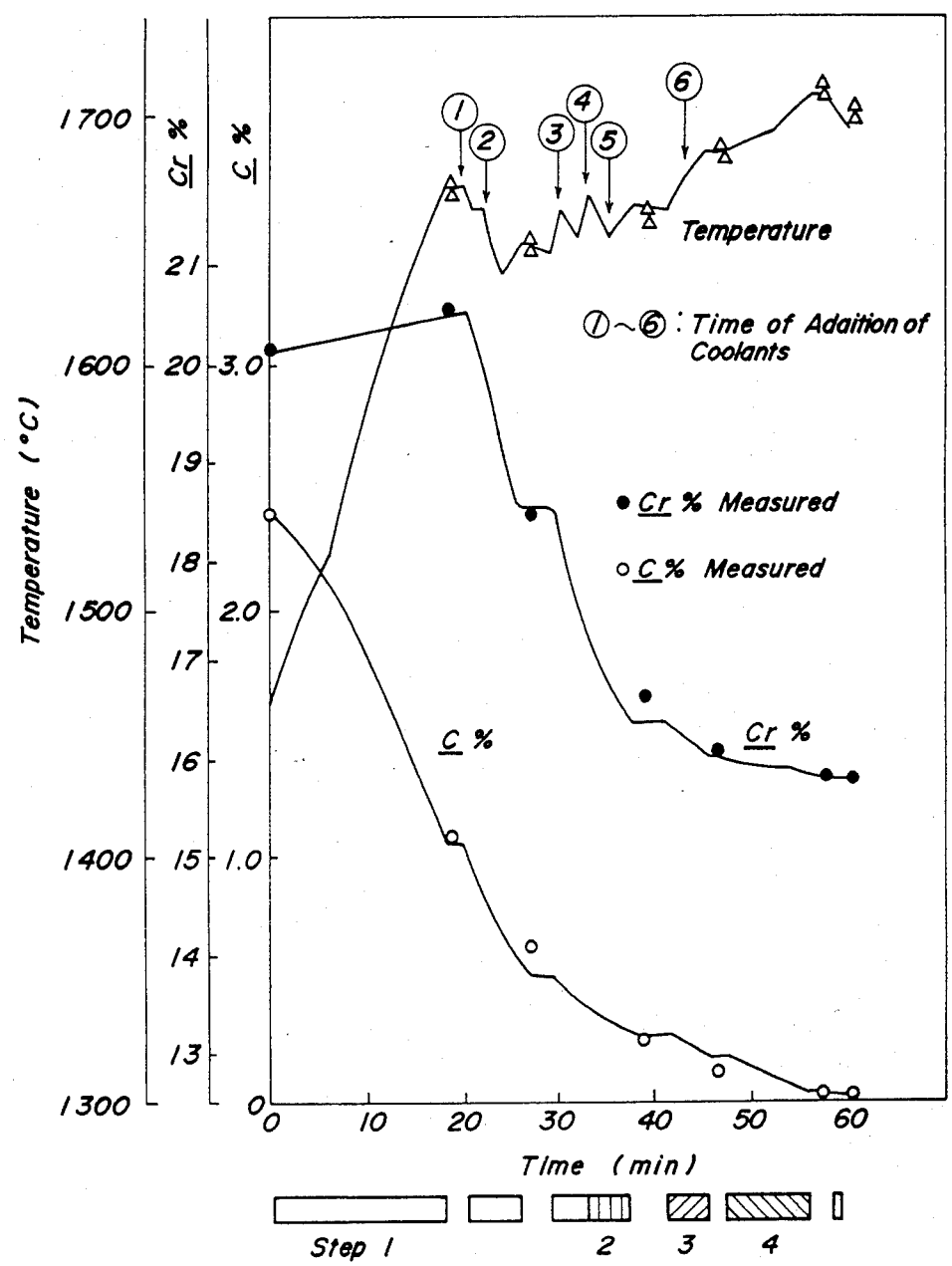
FIG_6

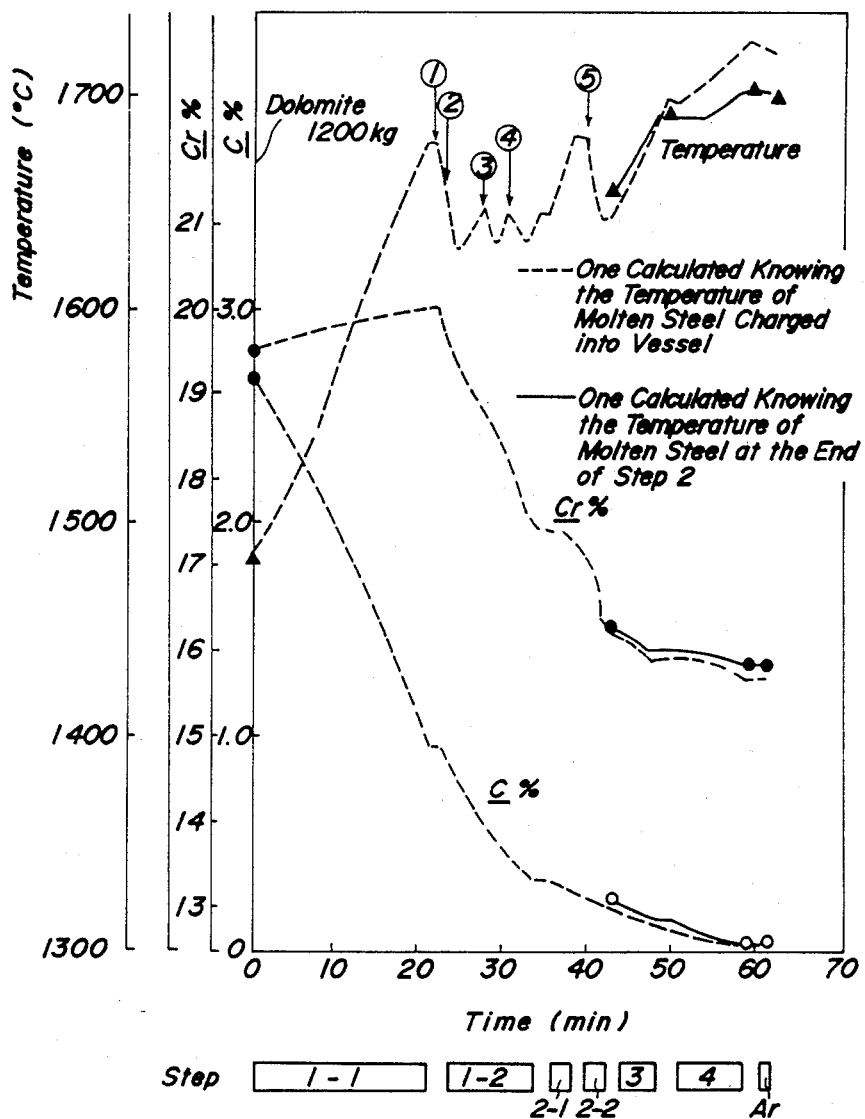

PROCESS FOR THE DECARBURIZATION OF MOLTEN METAL

DESCRIPTION OF THE PRIOR ART

In conventional computer implemented processes for the decarburization of molten metal, various analyses are made assuming an equilibrium relation in %[Cr]-%[C]-%($Cr_2O_3$ or $Cr_3O_4$)-Pco-Temperature. For example, a computer implemented process for the decarburization of molten metal is disclosed in U.S. Pat. No. 3,816,720. The official patent gazette describes as follows;

"A computer implemented process for optimizing the decarburization of a predetermined mass of molten metal by controlling the dilution ratio of injected oxygen to inert gas which comprises; calculating from the activity coefficient of each element in the mass a theoretical equilibrium partial pressure of carbon monoxide for the oxidation reaction of each element; calculating the absolute maximum partial pressure of carbon monoxide; selecting the lowest partial pressure and calculating a new metal analysis for the mass; changing the dilution ratio upon meeting a given criterion and repeating the process until the carbon level in the bath has dropped to a final level.

When steel is decarburized with oxygen, equilibrium is established among the metals, the carbon and oxygen at the particular temperature and pressure. Such equilibrium determines the extent to which carbon can be removed, without oxidizing metallics, chromium in particular, from the melt. It is now well recognized that the thermodynamic activity in the bath and the equilibrium established among the elements and the evolved gaseous atmosphere may be modified by dilution of the oxygen with an inert gas.

The limit to which the temperature may be elevated is based upon both practical and economic considerations relating to the effect of high temperatures on the life of the vessel lining as well as on the life of the tuyéres which are necessary for injecting the oxygen and inert gas directly into the melt from beneath its surface. On the other hand, dilution of the blowing oxygen with inert gas also involves economic considerations since it decreases the rate of steel production in proportion to the percent volume of inert gas introduced, not to mention the cost of the inert gas itself, which can be substantial.

Heretofore, the principle concern was to reduce the carbon content of the molten bath to a specified level while minimizing the oxidation loss of other elements. Other than the desire to prevent the rapid detrition of the refractory, by careful temperature surveillance, the process was conducted at the expense of relatively slow steel production rate and without regard to the quantity of inert gas utilized. The apparent lack of concern with economics was justified on the basis that it was impossible to sample the bath periodically during a production run to determine the extent of metallic oxidation and actual bath temperature. It was considered far wiser to insure as acceptable end melt composition than to risk making an off grade heat by increasing the rate of production and conserving inert gas. At the very best, certain generalized guidelines were empirically established, through actual experience, for changing the dilution ratio at fixed time intervals and at an assumed temperature condition for a specific melt using a given refractory lining composition.

SUMMARY OF THE INVENTION

It is an object of the invention to provide a program for optimizing the decarburization of a mass of molten metal in terms of achieving from knowledge of only the initial mass composition, weight and temperature, a predetermined end composition under the most favorable economic conditions.

It is another object of the the invention to provide a method for optimizing, in terms of combined performance and economics, the decarburization of a mass of molten metal to consistently yield final melt composition and temperature which conforms to a desired specification for such melt and at a relatively high rate of production.

The program of the the invention is based on the theoretical assumption that for any small interval of time the oxygen combines with carbon until sufficient pressure of carbon monoxide is generated that further combination of oxygen with carbon is precluded by the preference of oxygen for that metallic element the reduction of whose oxide produces the lowest equilibrium partial pressure of carbon monoxide. From such assumption a theoretical mathematical model has been developed for calculating, at given selected intervals of time, the lowest equilibrium partial pressure of carbon monoxide from which a new mass composition, weight and temperature of the melt can be determined and from which, either automatically or through an operator, readjustments may be made in the dilution ratio to optimize the process.

The mathematical model simulates the complicated natural processes occuring in the refractory lined vessel in terms of the reaction thermodynamics, heat and mass balances and thus predicts the progress of a heat. Although, the mathematical calculations may be made by a person; in practice, it could not be done quickly enough to be useful, and therefore the the process requires a computer for its practical use.

In its broadest aspects, the the invention is a method which controls the decarburization of a predetermined mass of molten metal including carbon and iron contained within a refractory lined vessel having means for injecting oxygen and a diluting gas into the mass and adjustable gas flow control means for varying the flow rate of the gases; wherein the process includes:

(a) setting the adjustable control means to establish a first flow rate greater than zero for oxygen and a first flow rate for the diluting gas;

(b) utilizing a computer to carry out the following sequence of steps;

(1) calculating, a plurality of activity coefficients, from the initial composition, weight and temperature of the mass of metal, that define the thermodynamic activities of each element in the mass as a function of the composition of the mass, each coefficient reflecting the activity of each element in terms of the percentage of the element and the dependency of the element on the percentage of the other elements in the mass, with the activity of iron being equal to its mole fraction and wherein the activities of the oxides of each element have predetermined values;

(2) calculating a theoretical equilibrium partial pressure of carbon monoxide for the oxidation reaction of each element by means of the coefficients at the given temperature;

(3) calculating the absolute maximum partical pressure of carbon monoxide assuming all the oxygen injected reacted solely with the carbon;

(4) selecting the lowest theoretical equilibrium partial pressure of carbon monoxide from (2) and comparing such with the absolute maximum partial pressure of carbon monoxide from (3);

(5) should the lowest theoretical equilibrium partial pressure be at least equal in magnitude to such absolute maximum partial pressure, then further calculate from the first gas flow rates, the amount of carbon oxidized and a new metal analysis and temperature for the composition;

(B 6) should the lowest theoretical equilibrium partial pressure be smaller in magnitude than such absolute maximum partial pressure, then further calculate from the theoretical equilibrium partial pressure of carbon monoxide and from the first gas flow rates the amounts of carbon and metal oxidized, a new metal analysis and temperature for the composition;

(7) providing an indication of the new carbon content in the mass;

(8) comparing the amount of oxidation of a specific single element in the mass with a preestablished limit of oxidation for the specific element;

(9) providing an indication for resetting the adjustable gas flow control means to increase the proportion of diluting gas should the amount of oxidation of the specific element be at least equal to the preestablished limit of oxidation;

(c) resetting the adjustable gas flow control means in accordance with the indication provided in step (9);

(d) repeating the sequence from step (1) at predetermined time intervals of less than two minutes until the carbon content indicated in step (7) has at least decreased to a predetermined level;

The program of the present invention is based on an improved program which controls the decarburization of a predetermined mass of molten metal comprising carbon and iron contained within a refractory lined vessel having means for injecting oxygen and a diluting inert gas into the mass and adjustable gas flow control means for the flow rate of the gases. The above-mentioned conventional method of decarburizing operation analysis is based on the theoretical assumption that for any small interval of time the oxygen combines with carbon until sufficient pressure of carbon monoxide is generated that further combination of oxygen with carbon is precluded by the preference of oxygen for that metallic element the reduction of whose oxide produces the lowest equilibrium partial pressure of carbon monoxide. That is, for example at refining operation of chromium containing steel it is assumed that a theoretical equilibrium relation between $\%[Cr]$-$\%[C]$-$\%(Cr_2O_3$ or $Cr_3O_4)$-$P_{co}$-temperature is kept. However using the program based on this assumption it is difficult to control precisely the refining operation.

According to the the program, (i) oxidation of metals is considered only by using the theoretical equilibrium relations, but is not considered by using the theory of reaction rate, so that changes of reactions occured during refining procedure can not be calculated. Therefore it is difficult to calculate charging times of coolants and in practical operations, at a time when temperature of molten steel elevates too hot or to the contrary lowers too cold, coolants are usually charged into a vessel, so that excessive oxidation of chromium is not seldom.

(ii) According to the assumption, oxidation degrees of silicon, manganese, chromium and iron are calculated comparing the theoretical partial pressure of carbon monoxide balanced with oxides of these elements and the partial pressure of carbon monoxide produced by all oxygen injected. Therefore, according to the said prior art, in spite of simultaneous formation of the oxides of above-mentioned four elements, it is only possible to calculate reaction degrees of the oxides at a case therein only carbon monoxide is formed or at another case therein carbon monoxide and any one oxide of above-mentioned four elements are formed.

Therefore, according to the program of the prior art, it is difficult to control precisely the refining operation.

BRIEF DESCRIPTION OF THE DRAWINGS

Advantages of the invention will be apparent from the following detailed description of the invention taken in conjunction with the following drawings in which:

FIG. 5 is a graph, which is calculatively established using Model II of the present invention and empirically established, showing changes of nitrogen content in a molten steel and efficiency of nitrogen absorption in the molten metal during decarburization in an AOD vessel having five nozzles.

FIG. 6 is a graph, which is calculatively established using Model II of the present invention and empirically established, changes of temperature of a molten metal and changes of %chroium and %carbon of the molten metal during decarburization in a new refractory lined AOD vessel having five nozzles.

FIG. 7 is a graph, which is calculatively established using Model II and empirically established showing changes of temperature of a molten metal and changes of %chromium and %carbon in the molten metal during decarburization of the molten metal in an AOD vessel, in the graph solid lines showing changes of temperature of the molten metal and changes of %chromium and %carbon in the molten metal calculated knowing temperature actually measured of the molten metal at a time in halfway during said decarburization.

DETAILED DESCRIPTION OF THE PROCESS

Figure 1:
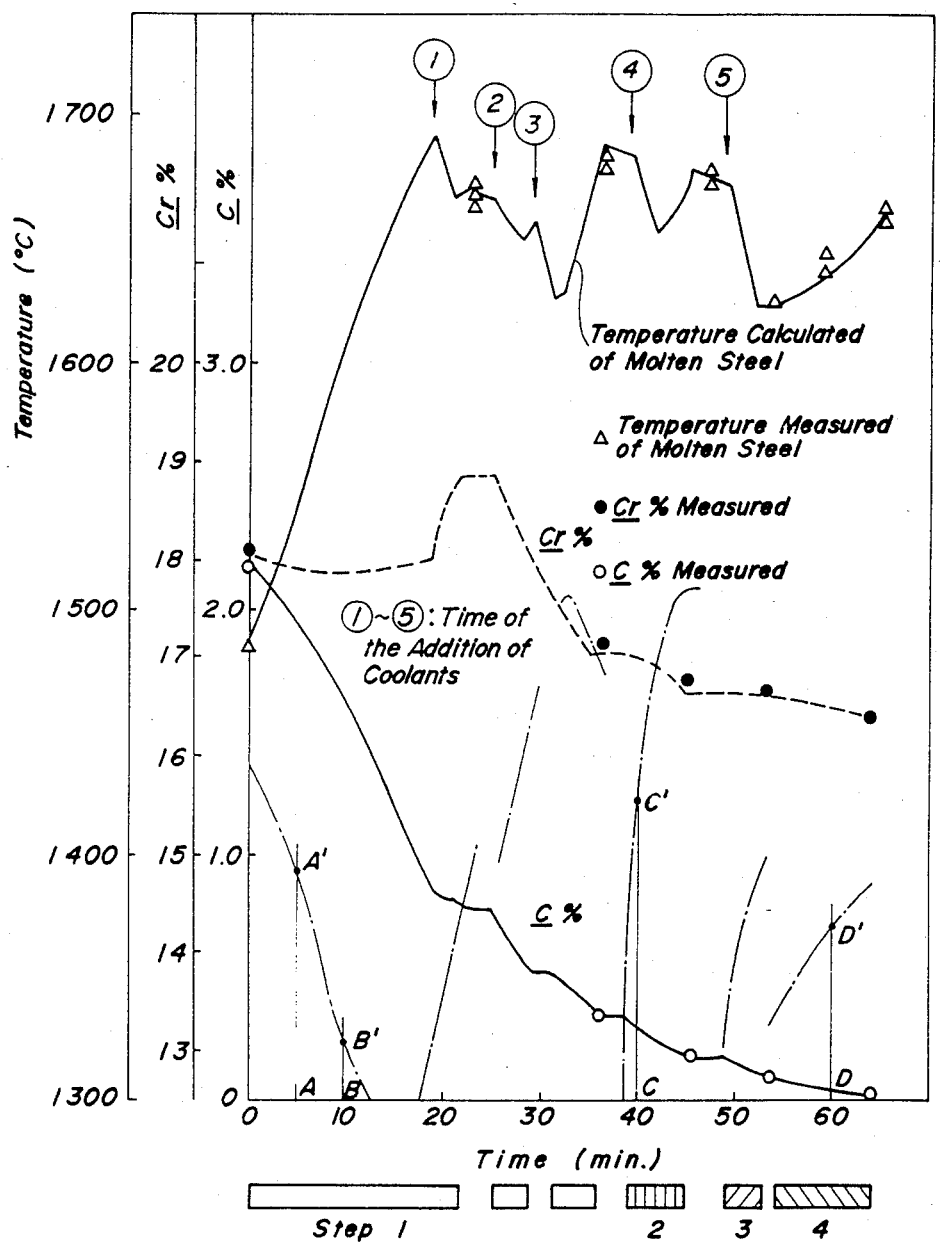
FIG. 1 is a graph, which is calculatively established using Model II of the present invention and empirically established, showing changes of temperature of a molten metal and changes of %chromium and %carbon in the molten metal during decarburization of the molten metal in an AOD vessel having four nozzles.

The inventor of the present invention made a mathematical Model (hereafter this model is written as Model I) which can simulate more precisely the decarburization procedure considering theoretical equilibrium relation and the theory of reaction rate of decarburization. Using Model I described below decarburization of chromium containing steel in AOD furnace (argon-oxygen decarburizing furnace) is made clear hereinafter.

Model I:

(1) oxygen-argon mixed refining gas injected into a refining vessel through plural tuyéres becomes bubbly, and as soon as oxygen gas comes into reaction with carbon, silicon, manganese and chromium in molten metal, $CO$, $SiO_2$, $MnO$ and $Cr_2O_3$ are formed. In this case it is assumed that amount of these oxides formed by the reaction depends upon rate of mass transfer of said four elements to the interface between gas and liquid. Equations (1) to (4) show the equations in the vicinity of tuyéres.

$$O_2 + 2C \longrightarrow 2CO \tag{1}$$

$$O_2 + 4/3Cr \longrightarrow \tfrac{2}{3}(Cr_2O_3) \tag{2}$$

$$O_2 + 2Mn \longrightarrow 2(MnO) \tag{3}$$

$$O_2 + Si \longrightarrow (SiO_2) \tag{4}$$

Distributions of oxygen to equations (1) to (4) are expressed by equations (5) to (8).

$$O_2(C) = \left(\frac{\tfrac{1}{2}J_C}{\Sigma J_j}\right) \cdot n_{o2}, \text{ mol/sec} \tag{5}$$

$$O_2(Cr) = \left(\frac{\tfrac{3}{4}J_{Cr}}{J_j}\right) \cdot n_{o2}, \text{ mol/sec} \tag{6}$$

$$O_2(Mn) = \left(\frac{\tfrac{1}{2}J_{Mn}}{J_j}\right) \cdot n_{o2}, \text{ mol/sec} \tag{7}$$

$$O_2(Si) = \left(\frac{J_{Si}}{J_j}\right) \cdot n_{o2}, \text{ mol/sec} \tag{8}$$

and further the flux $J_j$ to the interface from the bulk metal are shown in equations (9) and (10).

$$J_j = \frac{\rho_m}{100\, M_j} \cdot k_j \cdot A_B \cdot (\% C_{b,j} - \% C_{i,j}), \text{ mol/sec} \tag{9}$$

$$\Sigma J_j = \tfrac{1}{2} J_C + \tfrac{3}{4} J_{Cr} + \tfrac{1}{2} J_{Mn} + J_{Si}, \text{ mol/sec} \tag{10}$$

where:
j: any one selected from C, Si, Mn and Cr.
$\%C_{b,j}$: bulk concentration of j.
$\%C_{i,j}$: concentration j at the interface.
$n_{o2}$: amount of oxygen injected into vessel mol/sec.
$\rho_m$: density of liquid steel g/cm$^3$.
$k_j$: mass transfer coefficient of j cm/sec.
$A_B$: the surface of bubbles cm$^2$/sec.

(2) $Cr_2O_3$ and $MnO$ formed in equation (2) and (3) ascend mit bubbles in the molten metal, and in said ascending process as shown equations (11) to (14), said $Cr_2O_3$ and $MnO$ are reduced by carbon and silicon in molten metal (hereinafter said carbon and silicon are written as C and Si respectively).

$$\tfrac{1}{3}(Cr_2O_3) + C \longrightarrow \tfrac{2}{3}Cr + CO \tag{11}$$

$$(MnO) + C \longrightarrow Mn + CO \tag{12}$$

$$\tfrac{1}{3}(Cr_2O_3) + \tfrac{1}{2}Si \longrightarrow \tfrac{2}{3}Cr + \tfrac{1}{2}(SiO_2) \tag{13}$$

$$(MnO) + \tfrac{1}{2}Si \longrightarrow Mn + \tfrac{1}{2}(SiO_2) \tag{14}$$

It is assumed that rates of reaction in equations (11) to (14) depend upon a rate of mass transfer of oxygen in a high carbon region of the molten metal and depend upon a rate of mass transfer of carbon in a low carbon region of the molten metal and further the rates of reaction in equations (11) to (14) depend upon free energy of said equations respectively.

Changes of carbon monoxide concentration $$\frac{d(CO)}{dx}$$

in ascending bubbles and of concentrations of chromium, manganese and silicon $$\frac{d(Cr)}{dx}, \frac{d(Mn)}{dx}, \frac{d(Si)}{dx}$$

contained in respective oxides remained in bubbles and change of nitrogen concentration in bubbles are indicated in equations (15) to (19).

$$\frac{d(CO)}{dx} = j_o/V_B \frac{\Delta G_{11} + \Delta G_{12}}{\Delta G_T}, \text{ mol/cm} \tag{15}$$

$$\frac{d(Cr)}{dx} = -j_o/V_B \frac{\Delta G_{11} + \Delta G_{13}}{\Delta G}, \text{ mol/cm} \tag{16}$$

$$\frac{d(Mn)}{dx} = -j_o/V_B \frac{\Delta G_{12} + \Delta G_{14}}{\Delta G_T}, \text{ mol/cm} \tag{17}$$

$$\frac{d(Si)}{dx} = -j_o/V_B \frac{\Delta G_{13} + \Delta G_{14}}{\Delta G_T}, \text{ mol/cm} \tag{18}$$

$$\frac{d(N_2)}{dx} = \frac{\rho_m}{2800} \cdot \frac{A_B}{V_B} \cdot k_N(\% Nb - \%N, i), \text{ mol} \tag{19}$$

where
$\Delta G_{11,12,13,14}$: free energy of equation (11),(12),(13),(14) respectively cal
$j_o$: flux of oxygen, mol/sec
$k_o$: mass transfer coefficient of oxygen, cm/sec
$k_N$: mass transfer of nitrogen
$V_B$: ascending velocity of a bubble, cm/sec
%Oi: oxygen concentration equibrated with $Cr_2O_3$,
%Ob: oxygen concentration in the bulk steel,
%Nb: nitrogen concentration in the bulk steel,
%N,i: nitrogen concentration at the interface between bubble and liquid steel, The flux of oxygen $j_o$ from interface to bulk is indicated in equation (20).

$$j_o = \frac{\rho_m}{1600} \cdot AB \cdot k_o (\% \text{ O}i - \% \text{ O}b), \text{ mol/sec} \quad (20)$$

(3) Material balance of the molten metal and the slag is calculated assuming that oxides being not reduced in the ascending process of bubbles are absorbed into the slag phase and not used again for decarburizing reaction. Change of weight of the molten metal $dW_m/dt$ is indicated in equation (21) and change of composition of the molten metal $$\frac{d \% [C_i]}{dt}$$

is indicated in equations (22) and (23).

$$\frac{dW_m}{dt} = -\{\Sigma \Delta C_i \cdot M_i\} - \Sigma_1 \frac{dW_{sc,1}}{dt}, \text{ g/sec} \quad (21)$$

$$\frac{d[\% C_i]}{dt} = \frac{100 M_i}{W_m} \cdot \Delta C_i - \frac{\% C_i}{W_m} \cdot \frac{dW_m}{dt} - \quad (22)$$

$$\Sigma \frac{\% C_{i,1}}{W_m} \cdot \frac{dW_{sc,1}}{dt}, \%/\text{sec}$$

where i: C,Si,Mn,Ni,Cr respectively $$\frac{d[\% N]}{dt} = -\frac{2800}{W_m} \cdot \Delta N_2 - \frac{[\% N]}{W_m} \cdot \frac{dW_m}{dt} + \quad (23)$$

$$\frac{\rho_m \cdot k'_N \cdot A}{W_m} (\% \text{ N}' - \% \text{ N}b), \%/\text{sec}$$

where
ΔCi: oxidation of i, mol/sec
Mi: atomic weight of i, g/mol
l: kinds of scrap charged into vessel
$W_{sc}$: weight of scrap charged into vessel, g
ΔN2: amount of denitrization into bubble, mol/sec
$\rho_m$: density of molten metal, g/cm³
$k'_N$: mass transfer coefficient of nitrogen in the molten metal at free surface, cm/sec
N': nitrogen concentration at free surface,%
A: area of free surface, cm²

Change of weight of molten slag $dW_s/dt$ and change of composition of molten slag $$\frac{d[\% M_xO_y]}{dt}$$

are indicated in equations (24) and (25) respectively.

$$\frac{dW_s}{dt} = \frac{M_{Cr_2O_3}}{2} \cdot \Delta Cr + M_{MnO} \cdot \Delta Mn + M_{SiO_2} \cdot \Delta Si + \quad (24)$$

$$M_{FeO} \cdot \Delta F_e - \frac{dW_{C_aO}}{dt}, \text{ g/sec}$$

$$\frac{d[\% M_xO_y]}{dt} = \frac{100 M_{M_xO_y}}{W_s} \cdot \Delta C_{M_xO_y} - \quad (25)$$

$$\frac{\% M_xO_y}{W_s} \cdot \frac{dW_s}{dt}, \%/\text{sec}$$

where
MxOy: Cr₂O₃,MnO,FeO,SiO₂
ΔCr: amount of Cr oxidized, mol/sec
ΔMn: amount of Mn oxidized, mol/sec
ΔSi: amount of Si oxidized, mol/sec
ΔFe: amount of Fe oxidized, mol/sec (4) Considering all heat of reaction produced in refining process, radiation loss from vessel mouth, heat loss through shell of vessel, heat of fusion of coolants and enthalpy of gas, heat balance is calculated and then change of temperature of molten metal is calculated from equation (26).

$$\frac{dT}{dt} = \Sigma Q/(C_{p,s} W_s + C_{p,m} W_m), °C/\text{sec} \quad (26)$$

where
$C_{p,s}$: specific heat of slag, cal/°C/g
$C_{p,m}$: specific heat of metal, cal/°C/g
ΣQ: sum of heat of reactions, heat losses from vessel and others, cal The program of refining operation calculated using Model I is compared with a procedure of an actual operation. FIG. 1 illustrates said comparison. The operational condition of the above-mentioned actual operation will be described in an example mentioned later. FIG. 1 shows change of temperature of a molten metal, changes of chromium content and carbon content in the molten metal, and oxidation loss of chromium, mol/sec depending on elapsed times.

According to FIG. 1, solid line, broken line and one-dot broken line show calculated values of Model I repectively. It is shown that said calculated values agree well with actually measured values shown as marks Δ, ●, o. In FIG. 1, chromium loss in unit time, i.e., oxidation rate of chromium is illustrated as points A′,B′,C′ and D′ being on the one-dot broken line depending on the respective times shown as A,B,C and D. It can be seen that at the respective times A,B,C and D oxidization of chromium took place respectively.

Tendencies of chromium oxidizations at points A,B,C and D in time, the oxidization being calculated from Model I and tendencies of chromium oxidizations calculated from the model written in the prior art, reached to results shown in Table 1. According to the calculation using the prior art, at points A,B and C in time a theoretical equilibrium partial pressure of carbon monoxide equilibrated with Cr₃O₄ is larger than the absolute maximum partial pressure of carbon monoxide calculated from amounts of oxygen and diluting gas injected into vessel, so that any oxidization of chromium can not occur. However the oxidization of chromium occurs at all times in actual operations, so that it is a sufficient evidence for the fact that the mathematical model of the prior art is faulty.

TABLE 1 comparative table of chromium oxidization

| Time | | | mathematical Model I | the prior art |
|---|---|---|---|---|
| A | Step 1 | O₂ 2880 Nm³/hr | Cr-loss yes | $(P^c_{CO})_{Cr} = K_{Cr} \cdot a_{Cr_3} \cdot O_4^{0.25}a = 5.16$ |
| | | N₂ 720 Nm³/hr | 9.5 (mol/sec) | |

TABLE 1-continued comparative table of chromium oxidization

| Time | | | | mathematical Model I | the prior art |
|---|---|---|---|---|---|
| | | 1.956% %C, 0.05% Si, 0.67% Mn 9.14% Ni, 17.90% Cr, 1536° C. | | | $P_{CO} = \dfrac{2 \times 2880}{2 \times 2880 + 720} = 0.889$ |
| B | Step 1 | ( $O_2$ 2880 Nm³/hr | Cr-loss yes | $(P^c_{CO})_{Cr} > P_{CO}$ Cr-loss no | |
| | | $N_2$ 720 Nm³/hr | 2.2 (mol/sec) | $(P^c_{CO})_{Cr} = 6.089$ | |
| | | 1.637% C, 0.01% Si, 9.20% Ni 17.84% Cr, 1604° C. | | $P_{CO} = 0.889$ $(P^c_{CO})_{Cr} > 0.889$ Cr-loss no | |
| C | Step 2 | ( $O_2$ 1200 m³/hr | Cr-loss yes | $(P^c_{CO})_{Cr} = 0.998$ | |
| | | $N_2$ 2400 m³/hr | 18.7 (mol/sec) | | |
| | | 0.344% C, 0.% Si, 0.5% Mn, 8.75% Ni, 16.94% Cr, 1680° C. | | | $P_{CO} = \dfrac{2 \times 1200}{2 \times 1200 + 2400} = 0.5$ |
| | | | | $(P^c_{CO})_{Cr} > P_{CO}$ Cr-loss no | |
| D | Step 4 | ( $O_2$ 900 Nm³/hr | Cr-loss yes | $(P^c_{CO})_{Cr} = 0.132$ | |
| | | Ar 2700 Nm³/hr | 7.1 (mol/sec) | | |
| | | 0.07% C, 0.% Si, 0.40% Mn, 8.84% Ni, 16.50% Cr, 1643° C. | | | $P_{CO} = \dfrac{2 \times 900}{2 \times 900 + 2700} = 0.4$ |
| | | | | $(P^c_{CO})_{Cr} < P_{CO}$ Cr-loss yes | |

According to the calculation of Model I, it takes several hours to know the values necessary to be applied for as actual operation, so that said Model I can not be put for practical use.

Therefore the inventor of the present invention has considered a following mathematical Model II which can be put for practical use.

Model II:

A refining reaction of a molten steel is indicated by following equations (27) to (31) macroscopicaly.

$$\{O_2\} + 4/3 Cr = \tfrac{2}{3} <Cr_2O_3> \tag{27}$$

$$\{O_2\} + 2Mn = 2(MnO) \tag{28}$$

$$\{O_2\} + Si = (SiO_2) \tag{29}$$

$$\{O_2\} + C = 2\{CO\} \tag{30}$$

$$N \longrightarrow \tfrac{1}{2}\{N_2\} \tag{31}$$

$$\tfrac{2}{3}<Cr_2O_3> + Fe = (FeO) + \tfrac{2}{3}Cr \tag{32}$$

where
< >; solid state
( ): liquid state
{ }: gaseous state
Cr,Mn,Si, and C: Cr,Mn, Si and C in molten steel Rates of the reactions by said equations can be calculated by assuming that the rates of the reactions depend upon the rates of mass transfer of the elements from the bulk metal to the interface between gas and molten metal.

Utilizing a computer to carry out the following sequence of steps:

(1) Amounts of oxidized metals are calculated by following means.

(1-1) Amounts of carbon, silicon and manganese oxidized per unit time are calculated from products of concentration difference of each element by a vessel factor, the vessel factor being calculated from an actual data measured and result calculated using Model I.

(1-2) It is assumed that remainders after subtracting the amount of oxygen consumed in said oxidizing reactions shown in equations (28) to (30) from the amount of oxygen injected during the unit time is the amount of oxygen consumed for the oxidization of chromium.

(1-3) As shown in equation (32) iron in the molten metal is oxidized by $Cr_2O_3$ in the slag. At any time of said reaction mole fraction Cr/Fe which is calculated by a data obtained at an actual operation in the slag is supposed to be maintained.

(2) At a case of using nitrogen as a diluting gas or at a case of using argon gas as a diluting gas, an amount of nitrization or of denitrization shown in equation (31) from the molten metal should depend upon a rate of mass transfer of nitrogen in the molten metal. Therefore the amount of the nitrization or of the denitrization is calculated as a product of difference of nitrogen concentration by the vessel factor obtained from a data of the actual operation and a result calculated using Model I.

(3) A change of temperature of the molten steel is calculated using values obtained from following steps:

(3-1) A material balance is calculated from the amounts of oxidization of carbon, silicon, manganese and chromium and iron, the amounts being obtained by above-mentioned (1) and (2). Then, the amount of nitrogen absorbed in the molten metal and the amount of denitrification out of the molten metal are calculated.

(3-2) A change of weight of the molten metal, a change of composition of the said elements contained in the molten metal, a change of weight of the molten slag and a change of composition of the slag are calculated.

(3-3) A heat balance in the molten steel and the slag is calculated from the heats of oxidizing reactions shown in equations (27) to (30) and (32), the amount of heat loss of the vessel and the amounts of heats of fusion of coolants.

(4) Weight, composition, and temperature of the molten metal and slag after predetermined time interval which is less than ten seconds are calculated using above-mentioned values of changes per unit time.

(5) A ratio of the amount of oxygen to the amount of a diluting gas is changed to increase the proportion of the diluting gas and the amounts of gases injected into the vessel are changed at the point in time when the amount of the decarburization calculated at above-mentioned (1) reaches less than a predetermined amount of the decarburization.

(6) The calculations in (1) to (5) are repeated up to a time when carbon content in the molten metal calculated in above-mentioned (4) reaches a predetermined carbon content.

(7) A necessary amount of coolants is charged to lower a temperature of the molten metal up to a predetermined temperature range in a time when the temperature of the molten metal reaches a predetermined maximum temperature.

The repeat of above-mentioned calculations is stopped in a time when a predetermined carbon content in the molten metal is obtained, that is, the time is an end point in time of the process.

According to the process of the present invention, said each predetermined time interval in the steps is less than ten seconds and the diluting gas is selected from the class consisting of helium, neon, argon, krypton, nitrogen, xenon and mixtures thereof.

Figure 2:
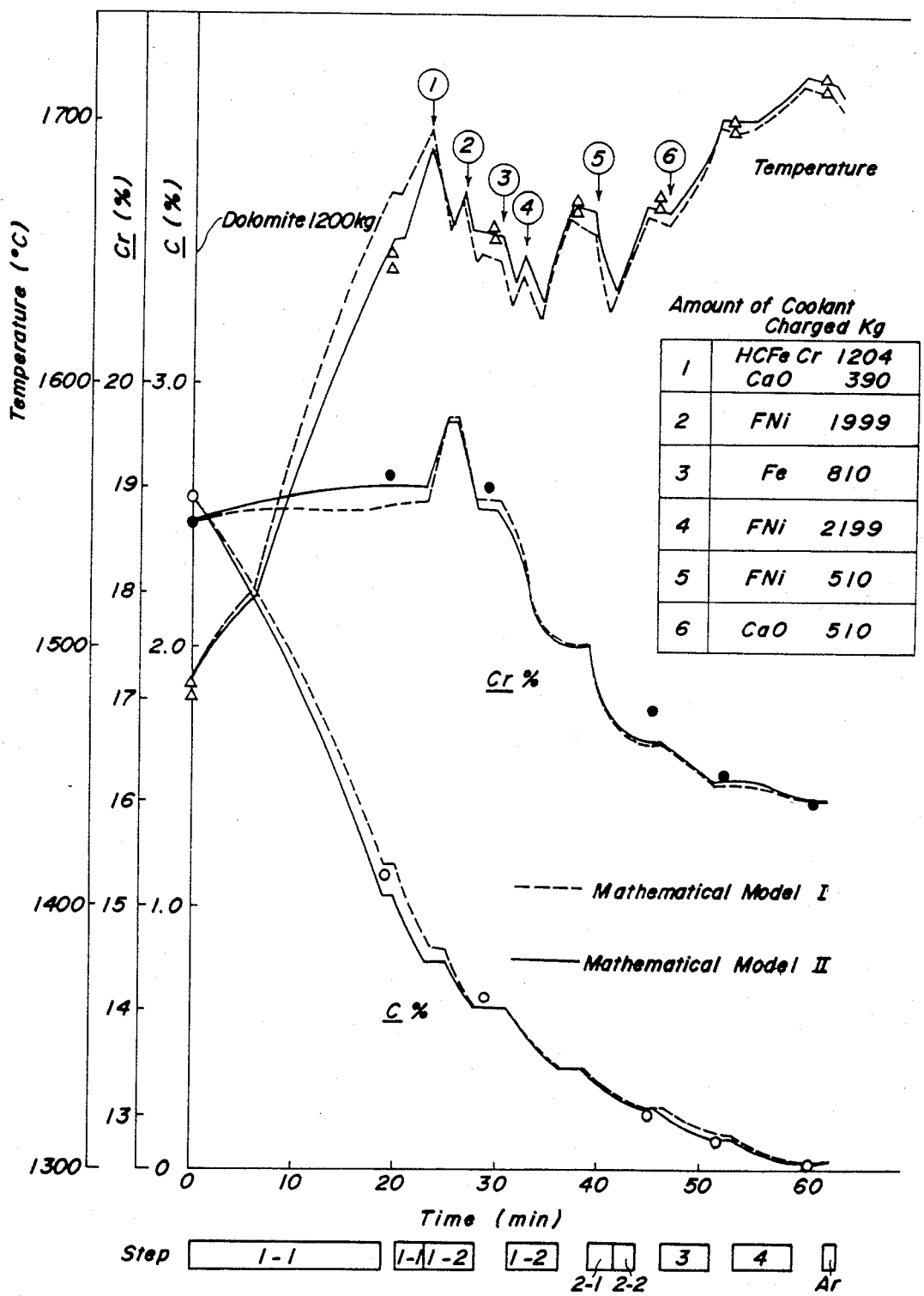
FIG. 2 is a graph, which is calculatively established using Model I and II of the present invention and empirically established, showing changes of temperature of a molten metal and changes of %chromium and %carbon of the molten metal during decarburization of the molten metal.

FIG. 2 illustrates a comparative graph of calculating values obtained from said mathematical Model I and II. According to FIG. 2, it is seen that the both calculating values agree very well with each other and also with values obtained by practical operation.

Figure 3:
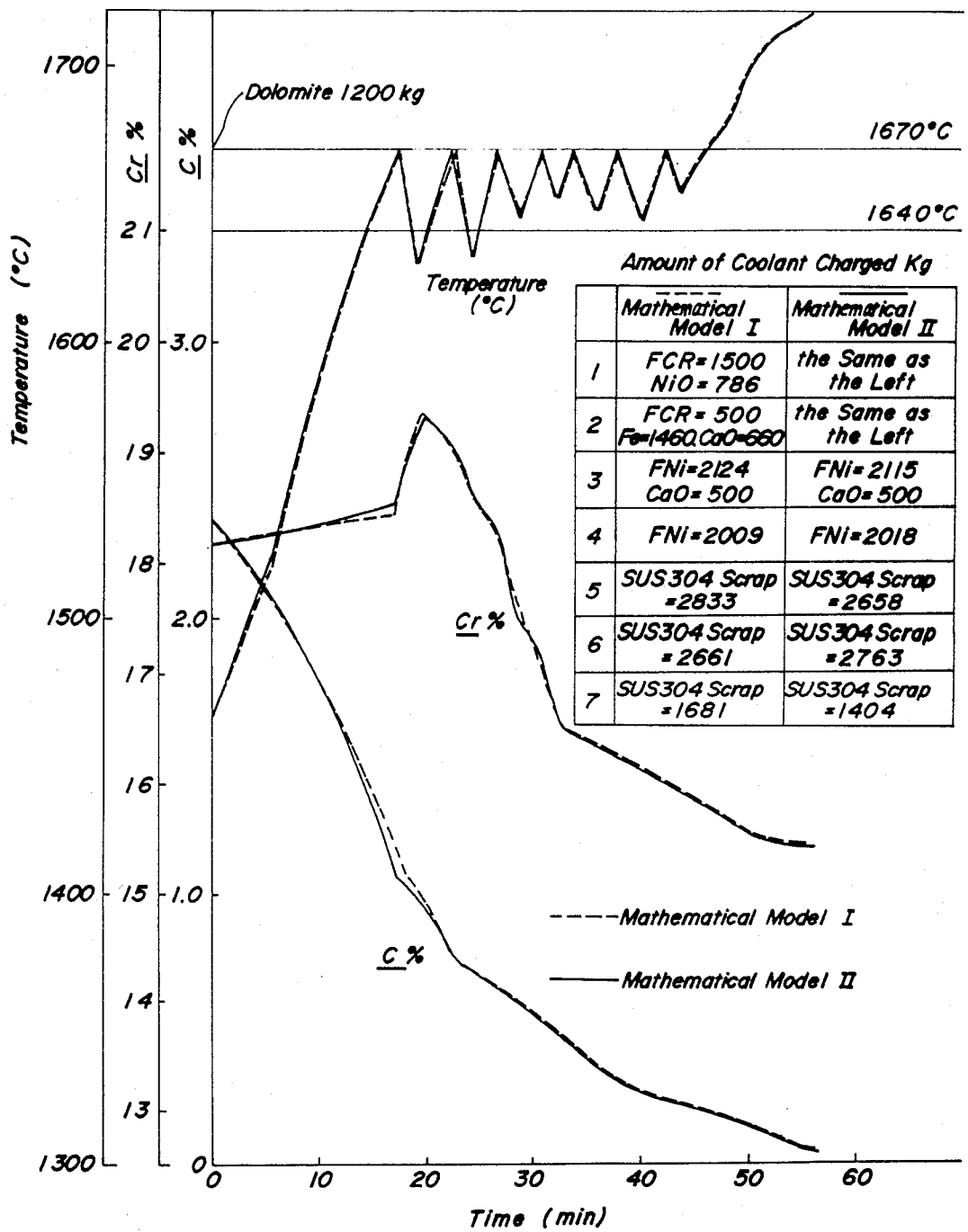
FIG. 3 is a graph, which is calculatively established using Model I and Model II of the present invention, showing changes of temperature of a molten steel and %chromium and %carbon in the molten metal during decarburization of the molten metal.

FIG. 3 also illustrates a comparative graph which is calculated by Model I and II showing amounts of coolants to be charged into vessel, charging times of coolants and changes of temperature and composition of the molten metal in a calculating operation knowing a predetermined composition and temperature of a molten metal. According to FIG. 3, it is seen that calculations using the mathematical Model I and II agree very well with each other.

Now it takes about 4 hours to achieve the calculations using the mathematical Model I and on the other hand it takes not more than 3 minutes to achieve the calculations using the mathematical Model II. Therefore it is understood that the Model II can be utilized effectively as a controlling program in an actual operation.

The present invention will be described hereinafter by practical embodiments thereof.

SUS 304 stainless steel was refined by the process of the present invention using an AOD vessel of capacity 60 tons.

One of said AOD vessels was a new refractory lined vessel having four or five tuyéres, the vessel being characteristic of larger depth of molten bath than that of refractory worn vessel because of non-erosion of vessel lining, and another vessel with somewhat worn-out refractory lining by fusion having four or five tuyéres, the vessel being characteristic of smaller depth of molten bath than that of the new refractory lined vessel because of erosion of vessel lining.

Example 1

FIG. 1 shows simulation curves by computer in a decarburizing operation using a new refractory lined AOD vessel having four tuyéres. In the process of the decarburization, change of temperature of molten metal (indicated by Δ), change of chromium concentration (indicated by ●) and change of carbon concentration (indicated by o) with the lapse of time were measured. In FIG. 1, 1 to 5 indicate the times when materials were charged into the vessel.

Followings are the materials charged into the vessel in the respective times, and the weights thereof.

| 1 | HCFeCr (high carbon ferro-chrom) | 1450 kg |
|---|---|---|
| 2 | iron scrap | 2100 kg |
| 3 | iron scrap | 2000 kg |
| 4 | stainless steel scrap | 2500 kg |
|   | CaO (lime) | 620 kg |
| 5 | stainless steel scrap | 2000 Kg |
|   | CaO (lime) | 620 Kg |

The amount of oxygen and nitrogen and the ratio of oxygen to nitrogen were changed at Step 1 to 4 respectively during the decarburization as seen in Table 2.

TABLE 2

|  | $O_2$ (Nm³/hr) | $N_2$ (Nm³/hr) | $O_2:N_2$ ratio |
|---|---|---|---|
| Step 1 | 2880 | 720 | 4:1 |
| Step 2 | 2400 | 1200 | 2:1 |
| Step 3 | 1200 | 2400 | 1:2 |
| Step 4 | 900 | 2700* | 1:3 |

*Used Ar gas as an inert gas

It can be seen in FIG. 1 that the change of the temperature of the molten metal (shown by the solid line), the change of chromium % (shown by the broken line), the change of carbon % (shown by solid line) and the change of the rate of chromium loss (shown by the one-dot broken line) predicted from the calculated values using Model I of the present invention are in very well agreement with the actually measured values respectively. It was thus confirmed that the process of the present invention is excellent to be applied for the decarburization of molten metal.

Figure 4:
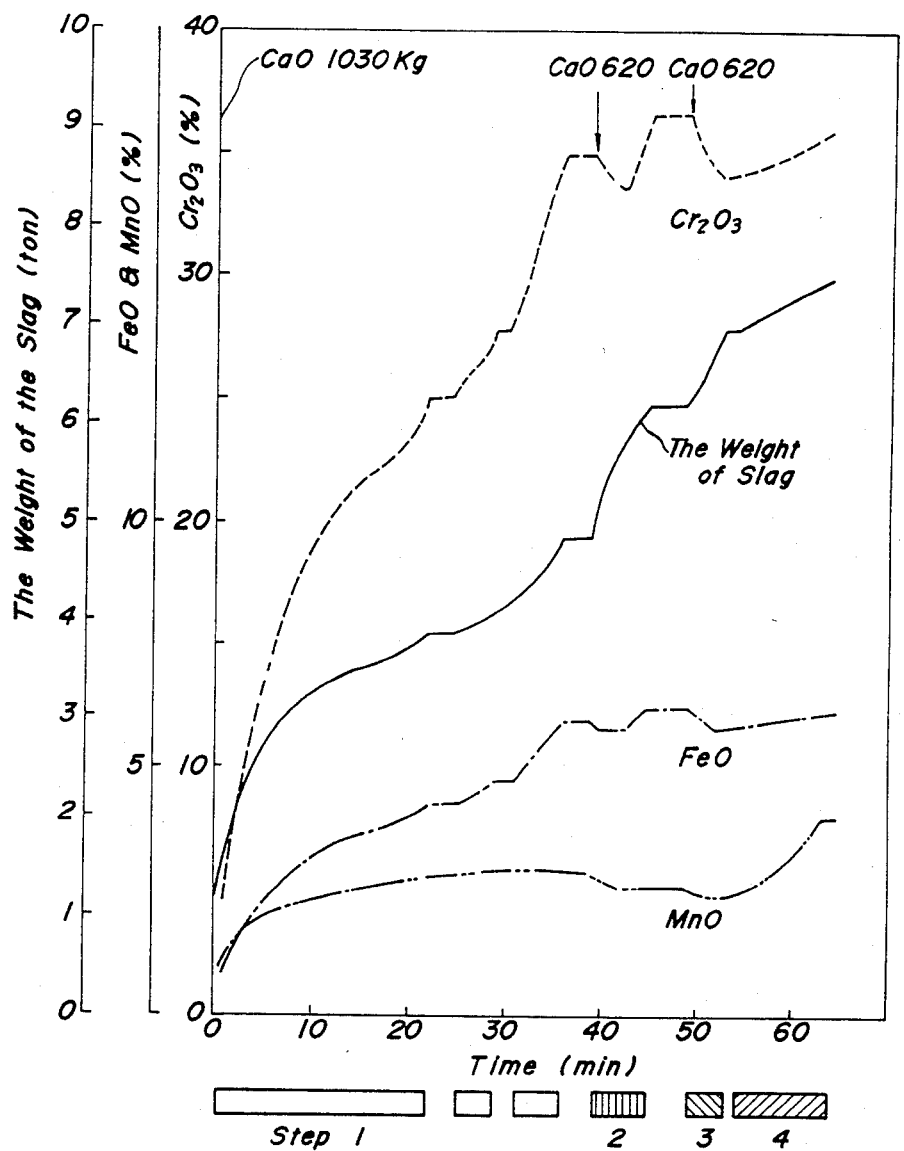
FIG. 4 is a graph, calculatively established using Model II of the present invention showing changes of weight of a slag and changes of %FeO,%MnO and %$Cr_2O_3$ in the slag during decarburization of a molten metal.

FIG. 4 shows change of weight of the slag, change of FeO%, change of MnO% and change of $Cr_2O_3$% with the lapse of time during the decarburization shown in FIG. 1. These changes with the lapse of time are calculative changes. Contrarily actual measurement of the changes was not done because of difficulty of the measurement.

Example 2

AISI 304 stainless steel was refined in a wornout refractory lined AOD vessel having five tuyéres. FIG. 2 shows comparatively the simulation curves using Model I and II of the present invention and actually measured values. Significance of Δ, ●, and o is the same as seen in FIG. 1. In FIG. 2, 1 to 6 are charging times of materials. The followings are the materials charged into the vessel in the respective times and weights thereof.

| 1 | HCFeCr | 1204 kg |
|---|---|---|
|   | CaO | 390 kg |
| 2 | Fe—Ni | 2000 kg |
| 3 | iron scrap | 810 kg |
| 4 | Fe—Ni | 2200 kg |
| 5 | Fe—Ni | 2000 kg |
|   | CaO | 510 kg |
| 6 | CaO | 500 kg |

The compositions of injecting gas components and amounts thereof were changed at four steps during the decarburizing process as shown in Table 3. Only argon gas was injected into the vessel for two minuites at the last time of Step 4.

TABLE 3

|        | O₂ (Nm³/hr) | N₂ (Nm³/hr) | O₂:N₂ ratio |
|--------|-------------|-------------|-------------|
| Step 1 | 3200        | 800         | 4:1         |
| Step 2 | 2667        | 1333        | 2:1         |
| Step 3 | 2000        | 2000        | 1:1         |
| Step 4 | 1000        | 3000        | 1:3         |

It is seen in FIG. 2 that change of temperature of the molten metal, change of Cr% in the molten metal and change of C% in the molten metal predicted from the calculated values using Model I and II of the present invention are in very well agreement with the actually measured values respectively. For instance the increase of chromium concentration by charging HCFeCr (i.e. high carbon ferro-chromium) into the vessel and the decrease of chromium concentration by charging Fe-Ni (i.e. ferro-nickel) into the vessel at step ②, ④ and ⑤ are well simulated.

FIG. 5 is a graph showing change of nitrogen concentrations calculated and measured respectively in the decarburizing operation shown by FIG. 2. It is seen that in Step 1 to 3 nitrogen gas was used as inert gas, so that nitrogen concentration of the molten metal increased and contrarily in Step 4 argon gas was used as inert gas, so that nitrogen concentration of the molten metal decreased considerably. The calculated values agreed well with the actually measured values indicated by mark ●.

Example 3

Decarburizing operation was achieved in a vessel having five tuyéres same as used at Example 2, but new lined refractory. The amounts of injected gases and the ratio of oxgen to diluting gas are the same as those shown in FIG. 2. The results of the operation are shown in FIG. 6.

In FIG. 6, ① to ⑥ are the charging times of material charged into the vessel. Following are the materials charged into the vessel in the respective times and the weights thereof.

| 1 | iron scrap | 950 kg  |
|---|------------|---------|
|   | NiO        | 786 kg  |
| 2 | Fe—Ni      | 1685 kg |
|   | iron scrap | 510 kg  |
|   | CaO        | 660 kg  |
| 3 | Fe—Ni      | 2272 kg |
| 4 | Fe—Ni      | 2176 kg |
| 5 | CaO        | 500 kg  |
| 6 | CaO        | 560 kg  |
|   | NiO        | 103 kg  |

It is seen in FIG. 6 that the calculated values using Model II of the present invention are in well agreement with the actually measured values.

In Table 4 are shown the temperature of the molten metal and the composition thereof at the termination of the decarburizing operation achieved in Examples 1 to 3.

TABLE 4

The comparison of the Operation Data and Calculation.

|             | Temp (°C.) | % C   | % Si | % Mn | % Ni | % Cr  | % N   |
|-------------|------------|-------|------|------|------|-------|-------|
| 4-Nozzle Operation (Example 1) | | | | | | | |
| Op. Result  | 1660       | 0.039 | 0.00 | 0.32 | 8.99 | 16.41 | 0.036 |
| Calculation | 1657       | 0.033 | 0.00 | 0.29 | 8.87 | 16.42 | 0.034 |
| 5-Nozzle Operation (Example 2) | | | | | | | |
| Op. Result  | 1715       | 0.026 | 0.00 | 0.52 | 8.84 | 15.98 | 0.064 |
| Calculation | 1715       | 0.030 | 0.00 | 0.39 | 8.90 | 16.06 | 0.065 |
| 5-Nozzle Operation (Example 3) | | | | | | | |
| Op. Result  | 1700       | 0.029 | 0.00 | 0.54 | 8.88 | 15.80 | 0.057 |
| Calculation | 1694       | 0.027 | 0.00 | 0.53 | 8.99 | 15.81 | 0.061 |

Example 4

Knowing composition and temperature of a molten metal charged into an AOD vessel, a decarburizing operation was achieved using Models of the present invention. On a halfway the operation was stopped and the composition and temperature of the molten metal were measured actually. After that, being based said measured composition and said measured temperature of the molten metal, the operation was reopened using Models of the present invention. In FIG. 7, the result of the above-mentioned operations is shown. In FIG. 7, ① to ⑦ show charging times of materials charged into the vessel. Followings are kinds and weights of materials charged into the vessel at the respective times.

| 1 | Fe    | 820 kg  |
|---|-------|---------|
|   | NiO   | 786 kg  |
| 2 | Fe—Ni | 608 kg  |
|   | CaO   | 590 kg  |
| 3 | Fe—Ni | 1533 kg |
|   | Fe—Cr | 193 kg  |
| 4 | CaO   | 500 kg  |
|   | Fe—Ni | 1731 kg |
| 5 | Fe—Ni | 2476 kg |
|   | CaO   | 500 kg  |

In FIG. 7, the broken lines show the simulation curves of the decarburizing operation opearated knowing composition and temperature of the molten metal charged into the vessel and using the Models of the present invention. At the last time of Step 2, checking the composition and temperature of the molten metal was made. After checking, it was found that the actually measured temperature was 15° C. higher than the calculated temperature and Cr% in the molten metal was somewhat lower than the calculated Cr%, so that the molten metal was over-oxidized to some extent.

Therefore, in order to suppress the rise of temperature the amount of injecting oxygen was decreased by 15% from the predetermined amount of oxygen in the subsequent operation. In FIG. 7, the broken lines show values calculated knowing temperature of the molten metal charged into the vessel and solid lines show values calculated knowing temperature of the molten metal actually measured at the last time of Step 2. The actually measured values of temperature, %Cr and %C are indicated by ▲, ●, o respectively. As seen in FIG. 7, the temperature of the molten metal at the last time of the decarburizing operation could be lowered, and also the loss of chromium could be prevented in evading the over-oxidation of the molten steel.

In Table 5, are shown the measured composition and the measured temperature of the molten metal at the initial time of the operation; the calculated compositions and the calculated temperatures of the molten metal at the last time of Step 2 and at the last time of the decarburization knowing above-mentioned composition and temperature of the molten metal at the initial time of the operation; the composition and the temperature of the molten metal at the last time of the decarburization calculated knowing the composition and the temperature of the molten metal at the last time of Step 2; and the actually measured composition and the actually measured temperature of the molten metal at the last time of the decarburization. After Step 4, only argon gas was injected into the vessel to bring a reaction between excess oxygen and carbon in the molten metal to completion.

In Table 6 are shown the composition of injecting gas components and the amounts thereof in the respective steps.

According to the computer implemented process of the present invention, considering the oxidization of chromium and iron out of their equilibrium, the oxidization being not considered in conventional processes of decarburization of molten metal, the determination of the charging times of

TABLE 5

| temperature and composition of molten metal | | Temp (°C.) | % C | % Si | % Mn | % Ni | % Cr |
|---|---|---|---|---|---|---|---|
| measured at the initial time of the operation | | 1435 | 2.687 | 0.40 | 0.89 | 5.63 | 19.59 |
| measured at the last time of Step 2 | | 1655 | 0.234 | 0.0 | 0.57 | 9.09 | 16.25 |
| measured at the last time of Step 4 | | 1705 | 0.029 | 0.0 | 0.52 | 9.16 | 15.85 |
| measured after argon-decarburization | | 1700 | 0.027 | 0.0 | 0.52 | 9.16 | 15.85 |
| calculated knowing the measured values of the molten metal charged into vessel | at the last time of Step 2 | 1640 | 0.210 | 0.0 | 0.55 | 9.20 | 16.15 |
| | at the last time of Step 4 | 1724 | 0.020 | 0.0 | 0.50 | 9.22 | 15.68 |
| | after argon-decarburization | 1720 | 0.018 | 0.0 | 0.50 | 9.22 | 15.68 |
| calculated knowing the measured values of the molten metal at the last time of Step 2 | at the last time of Step 4 | 1702 | 0.026 | 0.0 | 0.55 | 9.18 | 15.84 |
| | after argon-decarburization | 1699 | 0.025 | 0.0 | 0.55 | 9.18 | 15.84 | coolants and the amounts thereof, and the control of the injecting gas and of end point in time of the decarburization can be achieved precisely.

TABLE 6

| Step | amount of injected gas (Nm³/hr) | |
|---|---|---|
| 1-1 | O₂ = 3200 | N₂ = 800 |
| 1-2 | O₂ = 3000 | N₂ = 1000 |
| 2-1 | O₂ = 2667 | N₂ = 1333 |
| 2-2 | O₂ = 2400 | N₂ = 1600 |
| 3* | O₂ = 2000 | N₂ = 2000 |
| 4* | O₂ = 1000 | Ar = 3000 |
| argon decarburization | | Ar = 2200 |

Note:
In the actual operation, the amount of oxygen injected in Step 3* and 4* were reduced by 15% from the amount written in Table 6.

What is claimed is:

1. A process which controls decarburization of a predetermined mass of molten metal comprising carbon and iron, said mass being contained within a refractory lined vessel having means for injecting oxygen and a diluting gas therein, and adjustable gas flow control means for varying the flow rate of the respective gases; said process comprising:

(a) setting said adjustable control means to establish a first flow rate greater than zero for said oxygen and a first flow rate for said diluting gas;
(b) utilizing a computer to carry out the following sequence of steps:
  (1) calculating amount of oxidization of metal using values obtained from following calculations:
  (1-1) calculating amounts of carbon, silicon and manganese oxidized per unit time from product of concentration difference of each element between reaction interface and bulk metal by a vessel factor calculated from an actual data measured and a result calculated using a Model I, said Model I comprising:
    (1) Oxygen-argon mixed refining gas injected into a refining vessel through plural tuyeres becomes bubbly, and as soon as oxygen gas comes into reaction with carbon, silicon, manganese and chromium in molten metal, CO, SiO₂, MnO and Cr₂O₃ are formed;
    reactions in the vicinity of said tuyeres are shown by equations (1) to (4);

$$O_2 + 2C \longrightarrow 2CO \qquad (1)$$

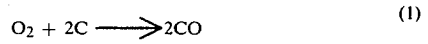   (2)

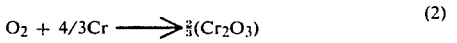   (3)

$$O_2 + Si \longrightarrow (SiO_2) \qquad (4)$$

distributions of oxygen to the reactions shown by equations (1) to (4) are expressed by equations (5) to (8)

$$O_2(C) = \left(\frac{\frac{1}{2}J_C}{\Sigma J_j}\right) \cdot \overset{\circ}{n}_{O_2}, \text{ mol/sec} \qquad (5)$$

$$O_2(Cr) = \left(\frac{\frac{3}{4}J_{Cr}}{\Sigma J_j}\right) \cdot \overset{\circ}{n}_{O_2}, \text{ mol/sec} \qquad (6)$$

$$O_2(Mn) = \left(\frac{\frac{1}{2}J_{Mn}}{\Sigma J_j}\right) \cdot \overset{\circ}{n}_{O_2}, \text{ mol/sec} \qquad (7)$$

$$O_2(Si) = \left(\frac{J_{Si}}{\Sigma J_j}\right) \cdot n_{O_2}, \text{ mol/sec} \quad (8)$$

and further the flux $J_j$ to the interface from the bulk metal are shown in equations (9) and (10);

$$J_j = \frac{\rho_m}{100 M_j} \cdot k_j \cdot A_B \cdot (\% \, C_{b,j} - \% \, C_{i,j}), \text{ mol/sec} \quad (9)$$

$$\Sigma J_j = \tfrac{1}{2} J_C + \tfrac{3}{4} J_{Cr} + \tfrac{1}{2} J_{Mn} + J_{Si}, \text{ mol/sec} \quad (10)$$

where:
j: any one selected from C, Si, Mn and Cr.
$\%C_{b,j}$: bulk concentration of j
$\%C_{i,j}$: concentration j at the interface
$n_{O_2}$: amount of oxygen injected into vessel, mol/sec
$\rho_m$: density of liquid steel, g/cm³
$k_j$: mass transfer coefficient of j, cm/sec
$A_B$: the surface of bubbles, cm²/sec (2) $Cr_2O_3$ and MnO formed in equations (2) and (3) ascend with bubbles in the molten metal, and in said ascending process are shown in equations (11)–(14), said $Cr_2O_3$ and MnO are reduced by carbon and silicon in molten metal (hereinafter said carbon and silicon are written as C and Si respectively);

$$\tfrac{1}{3}(Cr_2O_3) + C \longrightarrow \tfrac{2}{3} Cr + CO \quad (11)$$

$$(MnO) + C \longrightarrow Mn + CO \quad (12)$$

$$\tfrac{1}{3}(Cr_2O_3) + \tfrac{1}{2} Si \longrightarrow \tfrac{2}{3} Cr + \tfrac{1}{2}(SiO_2) \quad (13)$$

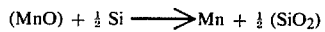
$$(MnO) + \tfrac{1}{2} Si \longrightarrow Mn + \tfrac{1}{2}(SiO_2) \quad (14)$$

rates of reaction in equations (11) to (14) depending upon a rate of mass transfer of oxygen in a high carbon region of the molten metal and depending upon a rate of mass transfer of carbon in a low carbon region of the molten metal, and further the rates of reaction in equations (11) to (14) depending upon free energy of said equations respectively; changes of carbon monoxide concentration $d(CO)/dx$ in ascending bubbles, changes of concentrations of chromium, manganese and silicon $d(Cr)/dx$, $d(Mn)/dx$, $d(Si)/dx$ contained in respective oxides remained in bubbles and changes of nitrogen concentration in bubbles being indicated in equations (15) to (19);

$$\frac{d(CO)}{dx} = \frac{j_o}{V_B} \cdot \frac{\Delta G_{11} + \Delta G_{12}}{\Delta G_T}, \text{ mol cm} \quad (15)$$

$$\frac{d(Cr)}{dx} = -\frac{j_o}{V_B} \cdot \frac{\Delta G_{11} + \Delta G_{13}}{\Delta G}, \text{ mol/cm} \quad (16)$$

$$\frac{d(Mn)}{dx} = -\frac{j_o}{V_B} \cdot \frac{\Delta G_{12} + \Delta G_{14}}{\Delta G_T}, \text{ mol/cm} \quad (17)$$

$$\frac{d(Si)}{dx} = -\frac{j_o}{V_B} \cdot \frac{\Delta G_{13} + \Delta G_{14}}{G_T}, \text{ mol/cm} \quad (18)$$

$$\frac{d(N_2)}{dx} = \frac{\rho_m}{2800} \cdot \frac{A_B}{V_B} \cdot k_N(\% \, Nb - \% \, N,i), \text{ mol/cm} \quad (19)$$

where:
$\Delta G_{11,12,13,14}$: free energy of equation (11), (12), (13), (14) respectively cal
$j_o$: flux of oxygen, mol/sec
$k_o$: mass transfer coefficient of oxygen, cm/sec
$k_N$: mass transfer coefficient of nitrogen, cm/sec
$V_B$: ascending velocity of a bubble, cm/sec
%Ob: nitrogen concentration in the bulk steel
%Nb: nitrogen concentration in the bulk steel nitrogen concentration in the bulk steel
%N,i: nitrogen concentration at the interface between bubble and liquid steel;
the flux of oxygen $j_o$ from interface to bulk being indicated in equation (20);

$$j_o = \frac{\rho_m}{1600} \cdot AB \cdot k_o(\% \, Oi - \% \, Ob), \text{ mol/sec} \quad (20)$$

(3) material balance of the molten steel and the slag being calculated as follows; change of weight of the molten metal $dWm/dt$ is indicated in equation (21) and change of composition of the molten metal $d\%/dt$ is indicated in equations (22) and (23);

$$\frac{dWm}{dt} = -\{\Sigma \Delta Ci \cdot Mi\} - \Sigma_l \frac{dW_{SC,l}}{dt}, \text{ g/sec} \quad (21)$$

$$\frac{d[\% \, Ci]}{dt} = \frac{100 Mi}{Wm} \cdot \Delta Ci - \frac{\% \, Ci}{Wm} \cdot \frac{dWm}{dt} - \quad (22)$$

$$\Sigma \frac{\% \, Ci,1}{Wm} \cdot \frac{dW_{SC,1}}{dt}, \%/\text{sec}$$

where
i: C, Si, Mn, Ni, Cr respectively $$\frac{d[\% \, N]}{dt} = -\frac{2800}{Wm} \cdot \Delta N_2 - \frac{[\% \, N]}{Wm} \cdot \frac{dW_m}{dt} + \quad (23)$$

$$\frac{\rho_m \cdot k'_N \cdot A}{Wm}(\% \, N' - \% \, Nb), \%/\text{sec}$$

where
$\Delta Ci$: amount of oxidation of i, mol/sec
$Mi$: atomic weight of i, g/mol
l: kinds of scrap charged into vessel
$W_{SC}$: weight of scrap charged into vessel, g
$\Delta N_2$: amount of denitrization in bubble, mol/sec
$\rho_m$: density of molten metal, g/cm³
$k'_N$: mass transfer coefficient of nitrogen in the molten metal at free surface, cm/sec
$N'$: nitrogen concentration at free surface, %
A: area of free surface, cm²
change of weight of molten slag $dWs/dt$ and change of composition of molten slag $$\frac{d[\% \, M_XO_Y]}{dt}$$

are indicated in equations (24) and (25) respectively.

$$\frac{dW_s}{dt} = \frac{M_{Cr_2O_3}}{2} \cdot \Delta Cr + M_{MnO} \cdot \Delta Mn + M_{SiO_2} \cdot \Delta Si + \qquad (24)$$

$$M_{FeO} \cdot \Delta Fe - \frac{dW_{CaO}}{dt}, \text{ g/sec}$$

$$\frac{d[\% M_xO_y]}{dt} = \frac{100 \, M_{M_xO_y}}{W_s} \cdot \qquad (25)$$

$$\Delta C_{M_xO_y} - \frac{\% M_xO_y}{W_s} \cdot \frac{dW_s}{dt}, \%/\text{sec}$$

where
    $M_xO_y$: $Cr_2O_3, MnO, FeO, SiO_2$
    $\Delta Cr$: amount of Cr oxidized, mol/sec
    $\Delta Mn$: amount of Mn oxidized, mol/sec
    $\Delta Si$: amount of Si oxidized, mol/sec
    $\Delta Fe$: amount of Fe oxidized, mol/sec (4) calculating heat balance from all heat of reaction produced in refining process, radiation loss through vessel mouth, heat loss through shell of vessel, heat of fusion of coolants and enthalpy of gas, and calculating change of temperature of molten metal from equation (26);

$$\frac{dT}{dt} = \Sigma Q/(C_{p,s} W_s + C_{p,m} W_m), °C/\text{sec} \qquad (26)$$

where
    $C_{p,s}$: specific heat of slag, cal/°C/g
    $C_{p,m}$: specific heat of metal, cal/°C/g
    $\Sigma Q$: sum of heat of reactions, heat losses from vessel and others, cal (1-2) providing that remainders after substracting the amount of oxygen consumed in said oxidizing reactions of sub-step (1-1) from the amount of oxygen injected during said unit time is the amount of oxygen consumed for the oxidization of chromium;

(1-3) calculating the amount of iron oxidized by $Cr_2O_3$ using mole fraction ratio Cr/Fe in the slag which is obtained at an actual operation; said mole fraction ratio Cr/Fe being constant at any time in the reaction;

(2) calculating the amount of nitrogen absorbed per unit time in molten metal or removed per unit time from molten metal from product of concentration difference of nitrogen between reaction interface and bulk metal by the vessel factor obtained in (1-1);

(3) calculating change of temperature of the molten metal using values obtained from following calculations:

(3-1) calculating material balance from the amounts of oxidization of carbon, silicon, manganese, chromium and iron and from the amount of nitrogen absorbed in the molten metal or the amount of nitrogen removed from the molten metal, said amount being obtained by sub-steps (1) and (2);

(3-2) calculating change of weight of the molten steel, change of composition of the elements contained in the molten steel, change of weight of the molten slag and change of composition of the slag;

(3-3) calculating heat balance of the molten metal and the molten slag from heats of reaction at the oxidizing reaction, amount of heat loss out of said vessel and amount of heats of fusion of coolants;

(4) calculating weights, compositions and temperature of said molten metal and slag after predetermined time interval using said values of changes per unit time;

(c) changing the ratio of oxygen to a diluting gas to increase the proportion of said diluting gas and changing the amount of gases injected into said vessel at the point in time when amount of said decarburization calculated at sub-step (1) becomes less than a predetermined amount of decarburization;

(d) continuing blow of refining gas up to a time when carbon content in the molten metal calculated in sub-step (4) becomes equal to a predetermined carbon content;

(e) charging a necessary amount of coolants to lower the temperature of the molten metal down to a predetermined temperature range when temperature of the molten metal becomes equal to a predetermined maximum temperature.

2. A process as defined in claim 1 wherein each predetermined time interval in step (b) is less than ten seconds.

3. A process as defined in claim 2 wherein said diluting gas is selected from the class consisting of helium, neon, argon krypton, nitrogen, xenon and mixtures thereof.

* * * * *